(12) United States Patent
Tubbs

(10) Patent No.: US 6,656,514 B1
(45) Date of Patent: Dec. 2, 2003

(54) SPILL-PROOF LID AND CONTAINER

(76) Inventor: Venita Tubbs, 281 Martin Dr., Birmingham, AL (US) 35215

( * ) Notice: Subject to any disclaimer, the term of this patent is extended or adjusted under 35 U.S.C. 154(b) by 0 days.

(21) Appl. No.: 10/292,620

(22) Filed: Nov. 13, 2002

(51) Int. Cl.[7] .......................... B65D 43/16; B65D 51/00
(52) U.S. Cl. ..................... 426/115; 426/106; 220/229; 220/731
(58) Field of Search .................................. 426/115, 106; 220/229, 731, 734, 719, 701, 702, 736, 735; 215/311

(56) References Cited

U.S. PATENT DOCUMENTS

| | | | |
|---|---|---|---|
| 1,629,661 A | * | 5/1927 | Gerhard |
| 1,983,139 A | * | 12/1934 | Lovell |
| 2,436,291 A | * | 2/1948 | Daniel |
| 2,528,332 A | * | 10/1950 | Bergquist |
| 2,793,373 A | * | 5/1957 | Ewing |
| 3,061,080 A | * | 10/1962 | Stephen |
| 3,086,674 A | * | 4/1963 | Scheverman |
| 3,116,927 A | * | 1/1964 | Kuhlman |
| 3,315,402 A | * | 4/1967 | Scott et al. |
| 3,334,779 A | * | 8/1967 | Smith |
| 3,478,922 A | * | 11/1969 | Mole |
| 4,053,084 A | * | 10/1977 | Anderson |
| 4,328,904 A | * | 5/1982 | Iverson |
| 4,502,606 A | * | 3/1985 | Shillington et al. |
| 4,679,700 A | | 7/1987 | Tharrington et al. |
| 4,884,717 A | * | 12/1989 | Bussard et al. |
| 4,889,619 A | * | 12/1989 | Lynch |
| 5,224,646 A | * | 7/1993 | Biancosino |
| 5,593,059 A | * | 1/1997 | Neilson |
| 5,676,990 A | * | 10/1997 | Wawrzynski |
| 5,988,468 A | | 11/1999 | Murdoch et al. |
| 6,176,384 B1 | * | 1/2001 | Voloshin |
| 6,273,309 B1 | | 8/2001 | Oppelt |
| 6,286,698 B2 | * | 9/2001 | Hague et al. |

\* cited by examiner

*Primary Examiner*—Steve L. Weinstein
(74) *Attorney, Agent, or Firm*—Millen, White, Zelano & Branigan, P.C.

(57) ABSTRACT

A spill-proof lid cooperates with a container to provide an easy and entertaining way for toddler-aged children to learn independent feeding without creating a mess as they learn. The spill-proof lid has a plurality of cantilevered flaps that are substantially triangular in shape and have free ends defined by the apecies of the flaps. The bases of the flaps are each connected to radially extending collar that forms an exterior trough for collecting crumbs, the exterior trough having openings through which the crumbs may drop back in to the container. The radially extending collar is attached by a frustoconical flange to a rim which couples with the mouth of the container, the frustoconical flange being spaced from the rim by a gap which defines an internal trough for minimizing the chance that crumbs from within the container will pass through the openings in the external trough when the container is tilted. Preferably, the flaps are concave with their apecies meeting at a recessed location in the top surface of the lid defined by the flaps.

10 Claims, 3 Drawing Sheets

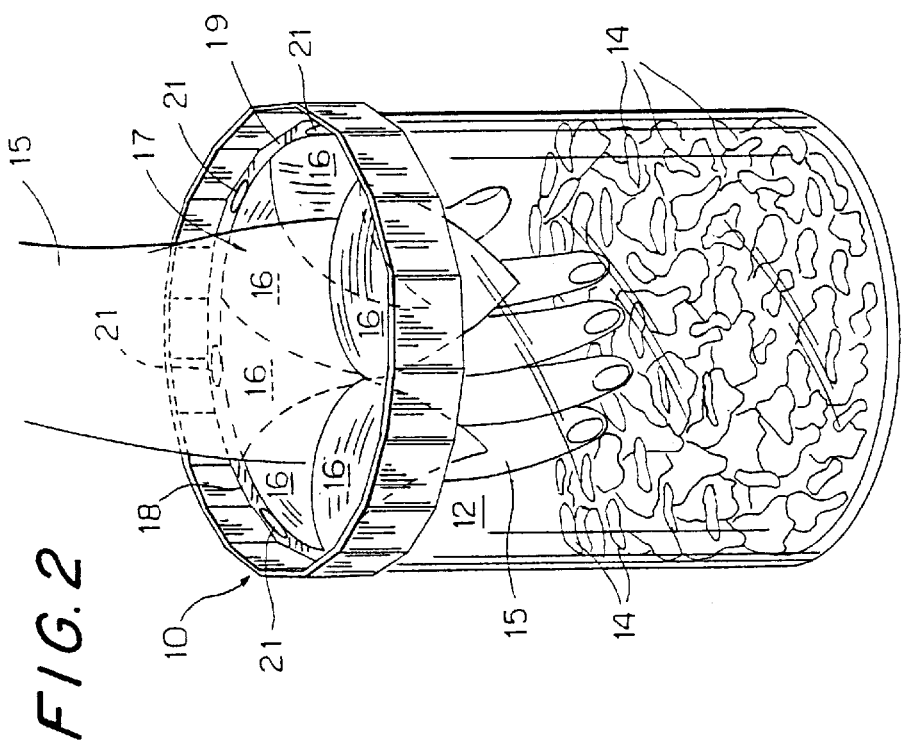
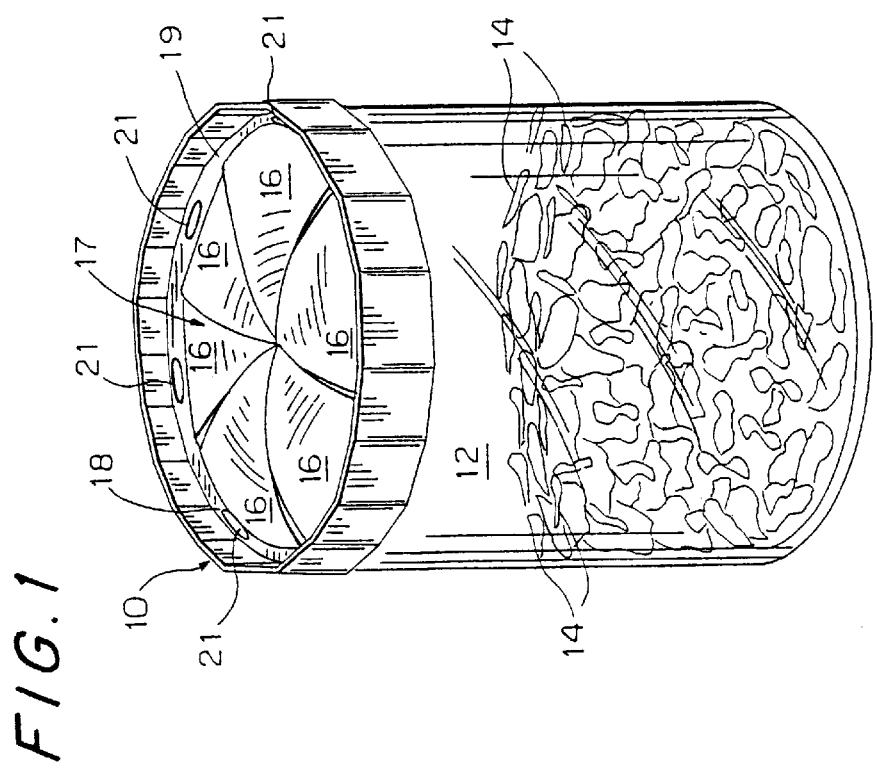

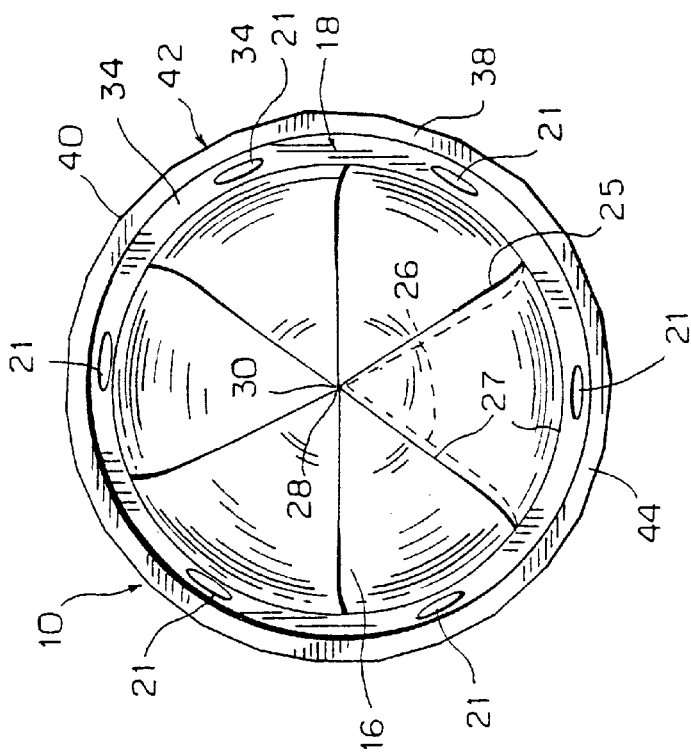
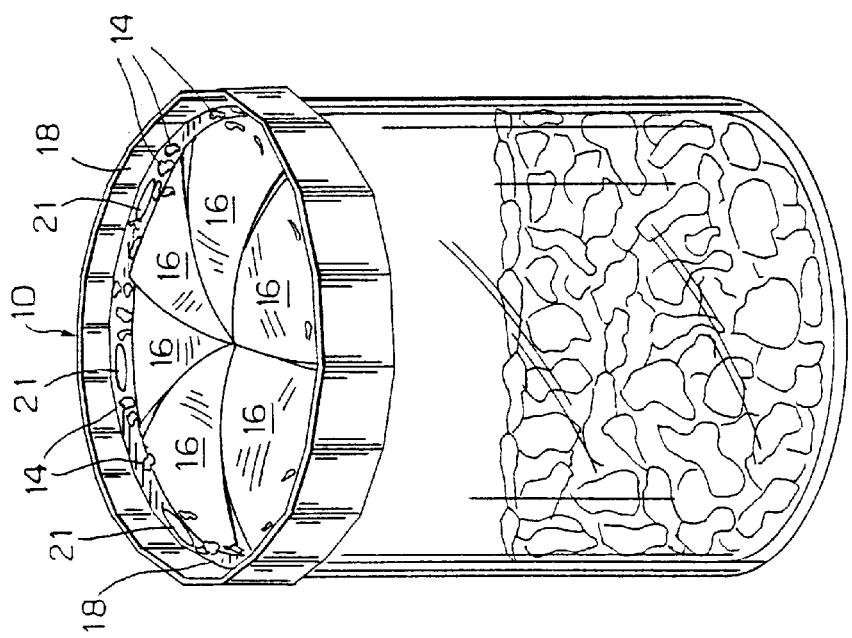

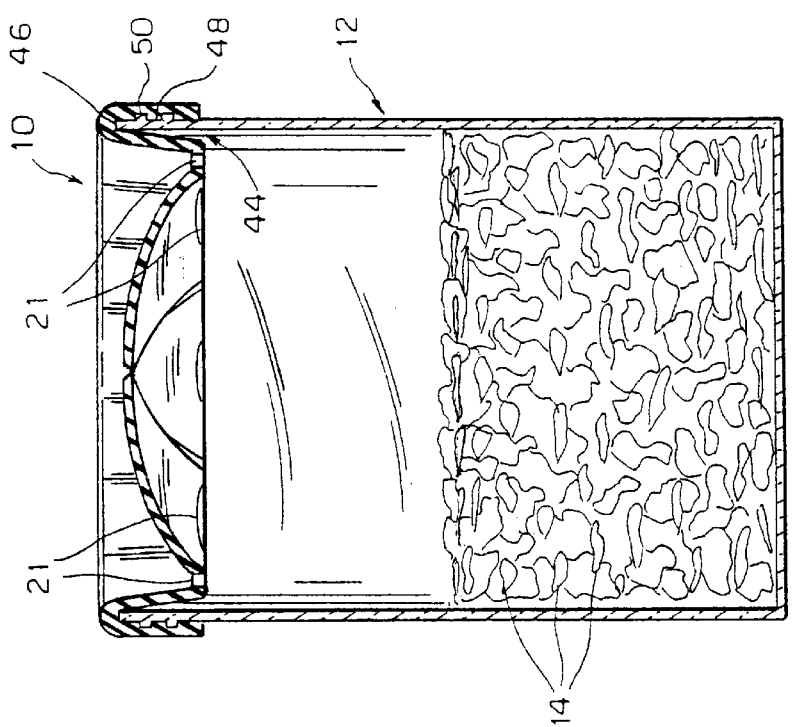
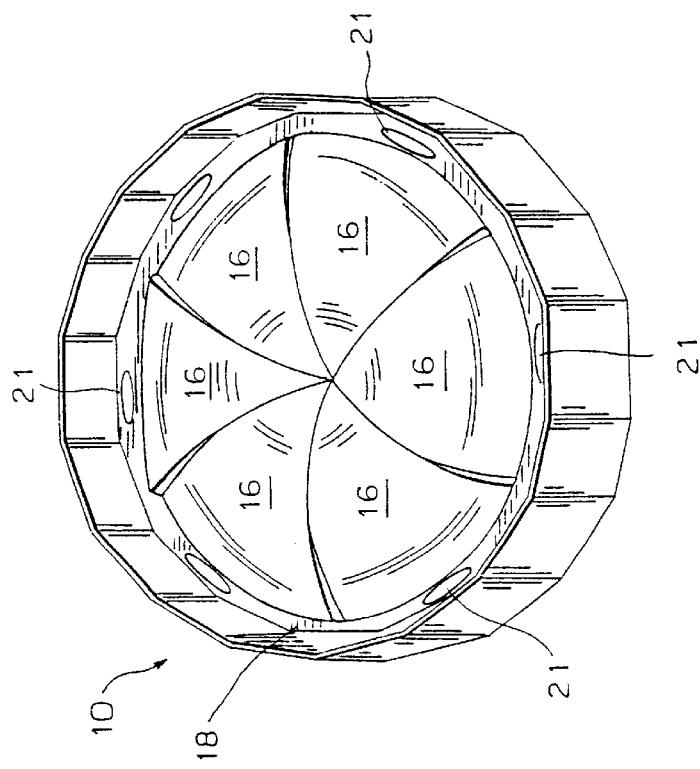

SPILL-PROOF LID AND CONTAINER

FIELD OF THE INVENTION

The present invention is directed to a spill-proof lid and container. More particularly, the present invention is directed to a spill-proof lid and container wherein the lid functions to keep solid items within the container until a child or other person deforms the lid in order to remove the solid items from the container.

BACKGROUND OF THE INVENTION

Toddler-aged children frequently consume solid food from containers as they progress to independent feeding. In so doing, toddler-aged children frequently create a mess by dislodging food items from the container and spilling the container's contents. Accordingly, there is a need for a container which controls the rate at which solid food items that can be removed therefrom by controlling the amount removed in easy attempt, as well as a container which minimizes spillage of food items, both when the container is tilted over and after food items have been withdrawn therefrom.

Caring for children is a time consuming undertaking in which it is certainly preferable to have as many positive experiences as possible. Cleaning up a toddler's mess is seldom rewarding and on occasion can create tension between a parent and child as well as harsh parental utterances which are not appreciated by the toddler and regretted by the parent.

In view of these and other considerations there is a need for improvements in spill-proof lids and in spill-proof lid container combinations.

SUMMARY OF THE INVENTION

The present invention is directed to a spill-proof lid for a container which contains a plurality of items accessed through the mouth of the container. The lid comprises a rim having a top end and a bottom end and a portion for coupling the rim to the mouth of the container. A frustoconical flange extends inwardly from the top end of the rim, the frustoconical flange having an annular bottom end spaced radially from the rim to provide an outer trough therebetween. The bottom end surrounds an opening through which the items in the container are accessed. A plurality of flexible, resilient flaps extend from a location at the bottom end of the rim inwardly toward the axis of the rim. The flaps terminate at free ends and in proximately with the axis of the lid and have convex outer surfaces defining an inner trough adjacent the frustoconical flange, whereby items are removable from the container by insertion of ones hand through the opening to deflect the flaps so as to allow withdrawal of the items through the opening. The flaps reclose the opening after the items have been removed therefrom with the interior and exterior troughs retaining items behind and on top of the rim, respectively.

In a further aspect of the invention, openings are provided in the second trough to permit items or portions of items to pass through the second trough back into the container. In still a further aspect of the invention, a radially extending collar to which the flaps are attached provides a floor for the second trough wherein the openings extend through the floor.

In a still further aspect of the invention the flaps are substantially triangular in shape, with each flap having a base attached to the aforementioned radially extending collar and an apex defining the free end of the flap terminating the axis of the lid.

Preferable materials for the spill-proof lid are plastic materials and rubber materials.

The invention further contemplates a combination of the aforedescribed spill-proof lid with a container having solid food items therein for use by toddler aged children.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a side perspective view of a spill-proof lid in accordance with the present invention mounted on a container;

FIG. 2 is a view similar to FIG. 1 but showing a hand reaching into the container to remove solid food items therefrom;

FIG. 3 is a view similar to FIGS. 1 and 2, but showing food items or portions of food items contained in a trough provided at the top of the spill-proof lid;

FIG. 4 is bottom view of the container lid;

FIG. 5 is a top view of the container lid, and

FIG. 6 is a side elevation of a container and lid configured in accordance with the principles of the present invention.

DETAILED DESCRIPTION

Referring now to FIGS. 1–3, there is shown a spill-proof lid 10 in combination with a container 12 having a plurality of food items 14 therein which are accessed through the spill-proof lid. The spill-proof lid 10 minimizes spillage of food items 14 in the container 12 and therefore provides an easy and entertaining way for toddler-aged children to learn the practice of independent feeding without creating the mess that is normally associated with this learning period.

As is seen in FIG. 1, the food items 14, may be small morsels such as dry cereal flakes or nuggets, or may be larger items such as crackers, cookies or portions of cookies or crackers. In accordance with the present invention, the items 14 are accessed as shown in FIG. 2 by a child pushing his or her hand 15 through the lid 10 to deflect one or more resilient, cantilevered rubber flaps 16 which normally provide a closure 17 for the container 12. The rubber flaps 16 are normally biased to the closed position of FIG. 1 or 3 so as to keep the food items 14 within the container 12. Since the flaps 16 are resilient as well as flexible, they return to the closed position of FIG. 1 when the child's hand 15 is removed from the container 10.

As is seen in FIG. 3, crumbs or small food particles which may break off or spill from the child's hand onto the lid 10 collect in an annular trough 18 around the periphery 19 a closure 20 defined by the flaps 16. Preferably, the angular trough 18 has a plurality of openings 21 in the form of slots so that at least some of the crumbs or food particles fall therethrough back into the container 12.

Referring now to FIGS. 4 and 5 where the bottom and top sides of the spill proof lid 10 are shown, it is seen that the flaps 16 have a substantially triangular configuration with each flap having sides 25 and 26, a base 27 and an apex 28 which forms a free-end of the flap. The apex 28 of each flap preferably intersects the axis 30 of the lid 10. While the apex 28 of each flap preferably intersects the axis 30, the apex may also be in substantial proximity with the axis 30 by not quite reaching the apex 30, or may perhaps extend beyond the axis 30. In a preferred embodiment of the invention, the flaps 16 may have one edge 25 or 26 that overlies the edge of an adjacent flap or even have two edges that overlie adjacent flaps so that the lid 10 completely encloses a container 12. On the other hand, the edges 25 and 26 may simply abut one another along a radial or curved line.

As is seen in FIG. 4 showing the top of the lid 10, the flaps 16 are each attached to a radially extending collar portion 34 that has the openings 21 therethrough. The collar portion 34 provides a floor for the outer trough 18 as seen in FIGS. 1–3. The radially extending collar 34 from which the flaps 16 extend is joined around its periphery to an inwardly and downwardly extending frustoconical flange 38 which is joined to the upper end 40 of a rim 42. Between the frustoconical flange 38 and the rim 42 is a gap 44 which functions as an internal, downwardly facing trough 45. The downwardly facing trough 45 formed by the gap 44 provides an inner trough which collects crumbs when the container 12 is tilted so that crumbs tend not to pass from the container 10 through the openings 21 into the outer trough 18.

The gap 44 also receives a top end 46 of the container 12, which top end has either threads or projections, such as ribs 48, which cooperate with ribs 52 in the inner surface of the rim 42 to hold the lid 10 on the container 12. Preferably, the lid 10 and container 12 are rotated with respect to one another to lock the lid to the container by positioning the projections 50 beneath the projections 48 on the container (see FIG. 6).

The spill-proof lid 10 can be made in various sizes to accommodate variously sized containers 12 and can be packaged with the containers so as to be in combination therewith. Preferably, the containers 12 are made of a hard plastic or other material of the required durability.

While the drawing figures show the flaps 16 of the spill-proof lid 10 unitary with a circumferential base formed by the rim 42, frustoconical flange 38 and radially extending collar 34, the flaps 16 can be attached, in accordance with another embodiment of the invention, to a circular wire frame that is in turn fixed in or to the rim 42.

From the foregoing description, one skilled in the art can easily ascertain the essential characteristics of this invention, and without departing from the spirit and scope thereof, can make various changes and modifications of the invention to adapt it to various usages and conditions.

I claim:

1. A spill proof-lid for a container that contains a plurality of items accessed through the mouth of the container, the lid comprising:
    a rim formed about an axis, the rim having a top end, a bottom end and a portion for coupling the rim to the mouth of the container;
    a frustoconical flange extending downwardly and inwardly from the top end of the rim, the frustoconical flange having an annular bottom end spaced radially from the rim to provide an inner trough therebetween, the bottom end surrounding an opening to access the items in the container, and
    a plurality of flexible resilient flaps extending from one location at the bottom end of the rim inwardly toward the axis of the rim, the flaps terminating at free ends positioned at least in proximity with the axis such that said flaps normally provide a closure of the opening by being biased to the closed position, and the flaps each having convex outer surfaces defining an outer trough adjacent the frustoconical flange such that when said lid is coupled to the mouth of the container containing said items said items are removable from the container by insertion of a hand through the opening to deflect the flaps and to allow withdrawal of items through the opening, the flaps reclosing the opening after items have been removed therethrough with the inner and outer troughs, respectively, retaining items behind the lid when the lid is tilted and retaining items on top of the lid when spilled thereon.

2. The spill-proof lid of claim 1 wherein openings are provided in the outer trough to permit items, or portions of items in the outer trough, to pass through the outer trough back into the container.

3. The spill-proof lid of claim 2 wherein the flaps are attached to the frustoconical flange by a radially extending collar which provides a floor for the outer trough with the openings being through the floor.

4. The spill proof lid of claim 3 wherein the flaps are substantially triangular in shape, with each flap having a base attached to the radially extending collar and an apex defining the free end thereof terminating at the axis.

5. The spill-proof lid of claim 4 wherein the convex outer surfaces of the flaps curve downwardly toward the apices of the triangles to form together an indentation in the lid at the axis of the lid.

6. The spill-proof lid of claim 5 wherein side edges of the triangular flaps overlap.

7. The spill-proof lid of claim 6 wherein the lid is made of plastic material.

8. The spill-proof lid of claim 6 wherein the lid is made of rubber material.

9. The spill-proof lid of claim 6 wherein the portion for coupling the rim to the container comprises a rotationally engaged coupling member.

10. In combination, a spill-proof lid to control spillage by toddler-age children and a container having solid food items therein which are dispersed through the mouth of the container, the combination comprising:
    a rim formed about an axis of the lid, the rim having a top end, a bottom end and a portion for coupling the rim to the mouth of the container;
    a frustoconical flange extending downwardly and inwardly from the top end of the rim, the frustoconical flange having an annular bottom end spaced radially from the rim to provide an inner trough therebetween, the bottom end surrounding an opening to access the items in the container, and
    a plurality of flexible resilient flaps extending from a location at the bottom end of the rim inwardly toward the axis of the rim, the flaps terminating at free ends positioned at least in proximity with the axis such that said flaps normally provide a closure of the opening by being biased to the closed position, and the flaps each having convex outer surfaces defining an outer second trough adjacent the frustoconical flange such that said items are removable from the container by insertion of a child's hand through the opening to deflect the flaps and to allow withdrawal of items through the opening, the flaps reclosing the opening after items have been removed from the container with the inner and outer troughs, respectively, retaining items behind the lid when the lid is tilted and retaining items on top of the lid when spilled thereon.

* * * * *